United States Patent
Lee et al.

(10) Patent No.: US 7,331,682 B2
(45) Date of Patent: Feb. 19, 2008

(54) BACK LIGHT MODULE WITH BIREFRINGENT CRYSTAL ASSEMBLIES

(75) Inventors: Chun-Yu Lee, Tu-Chen (TW); Jen-Tsorng Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 373 days.

(21) Appl. No.: 10/910,385

(22) Filed: Aug. 2, 2004

(65) Prior Publication Data

US 2005/0024848 A1 Feb. 3, 2005

(30) Foreign Application Priority Data

Aug. 1, 2003 (TW) .............................. 92121182 A

(51) Int. Cl.
*F21V 9/14* (2006.01)
(52) U.S. Cl. .................. 362/19; 362/612; 362/606; 362/607; 362/608; 359/483
(58) Field of Classification Search .................. 362/19, 362/612, 561, 555, 800, 606, 607, 608; 359/483–502, 359/61–71; 349/61–71
See application file for complete search history.

(56) References Cited

U.S. PATENT DOCUMENTS

| | | | | |
|---|---|---|---|---|
| 5,276,747 A | * | 1/1994 | Pan .............................. | 385/34 |
| 5,528,709 A | * | 6/1996 | Koike et al. .................... | 385/14 |
| 5,712,694 A | * | 1/1998 | Taira et al. ..................... | 349/9 |
| 5,886,759 A | | 3/1999 | Mashino et al. | |
| 6,163,351 A | * | 12/2000 | Nakayama .................... | 349/61 |
| 6,196,691 B1 | | 3/2001 | Ochiai | |
| 6,752,504 B2 | * | 6/2004 | Lee et al. ...................... | 362/27 |
| 6,886,954 B2 | * | 5/2005 | Williams et al. ............... | 362/19 |
| 6,976,779 B2 | * | 12/2005 | Ohtsuki et al. ............. | 362/608 |
| 7,021,812 B2 | * | 4/2006 | Maeda et al. ............... | 362/608 |
| 2002/0149924 A1 | * | 10/2002 | Falicoff et al. ................ | 362/19 |

FOREIGN PATENT DOCUMENTS

| | | | |
|---|---|---|---|
| JP | 06-160840 | * | 6/1994 |
| JP | 06-202107 | * | 7/1994 |
| JP | 09-326205 | * | 12/1997 |
| JP | 2002-373519 | * | 12/2002 |

* cited by examiner

*Primary Examiner*—Jong-Suk (James) Lee
*Assistant Examiner*—Jacob Y Choi
(74) *Attorney, Agent, or Firm*—Wei Te Chung

(57) ABSTRACT

A back light module (100) includes a light guide plate (130), a number of light sources (110) at one side of the light guide plate, and a number of birefringent crystal assemblies (120) respectively located between the light sources and the side of the light guide plate. Each birefringent crystal assembly includes a generally wedge-shaped first birefringent crystal (121) and a generally wedge-shaped second birefringent crystal (122) adhered to each other back-to-back. The birefringent crystal assembly enlarges a radiation angle of optical beams emitted from the corresponding light source. The optical beams with enlarged radiation angles enter the side of the light guide plate, and help provide excellent uniformity of brightness to an associated liquid crystal display panel.

16 Claims, 6 Drawing Sheets

BACK LIGHT MODULE WITH BIREFRINGENT CRYSTAL ASSEMBLIES

BACKGROUND OF THE INVENTION

1. Field of the Invention

This invention concerns light source systems, and more specifically a back light module typically used in a liquid crystal display (LCD).

2. Description of the Prior Art

Users of portable electronic devices such as laptop and notebook computers, mobile phones and game devices expect the viewing screens of portable electronic devices to be large, clear and bright. Performance equal to that of cathode-ray tube (CRT) desktop monitors is desired. LCDs are one type of flat panel display (FPD) that can satisfy these expectations. However, because liquid crystals in an LCD are not self-luminescent, the LCD needs a back light module that offers sufficient luminance (brightness) for a planar surface.

Referring to FIG. 10, a conventional back light module 20 includes a light guide plate 22, a plurality of light emitting diodes (LEDs) 21 adjacent to one side of the light guide plate 22. Light beams emitted from the LEDs 21 enter the side of the light guide plate 22 and eventually emit uniformly from a top surface of the light guide plate 22.

Referring to FIG. 11 and FIG. 12, a light intensity of the LED 21 rapidly decreases according to an increase of emission angle. In fact, almost all of the light intensity is concentrated in a small range and in the vicinity of the 0 degree emission angle (i.e., direct emission). In other words, the LED 21 has a very small effective radiation angle. When the LED 21 irradiates the side of the light guide plate 22, some areas of the light guide plate 22 proximate/corresponding to midpoints between adjacent LEDs 21 receive almost no light. Thus darkened areas are formed on the top surface of the light guide plate 22. The back light module 20 does not provide uniform brightness for an entire area of the associated liquid crystal display panel.

SUMMARY OF THE INVENTION

Accordingly, an object of the present invention is to provide a back light module which affords excellent uniform brightness for an associated liquid crystal display panel.

To achieve the above object, a back light module of a first preferred embodiment of the present invention includes a light guide plate, a plurality of aligned light sources at one side of the light guide plate, and a plurality of birefringent crystal assemblies respectively located between the light sources and the side of the light guide plate. Each birefringent crystal assembly includes a generally wedge-shaped first birefringent crystal and a generally wedge-shaped second birefringent crystal adhered to each other back-to-back. The birefringent crystal assembly enlarges a radiation angle of light beams emitted from the corresponding light source. The light beams with enlarged radiation angles enter the side of the light guide plate, thereby providing excellent uniformity of brightness for an associated liquid crystal display panel.

These and other features, aspects and advantages of the present invention will become more apparent from the following detailed description and claims, and from the accompanying drawings in which:

DETAILED DESCRIPTION OF PREFERRED EMBODIMENTS OF THE INVENTION

Figure 1:
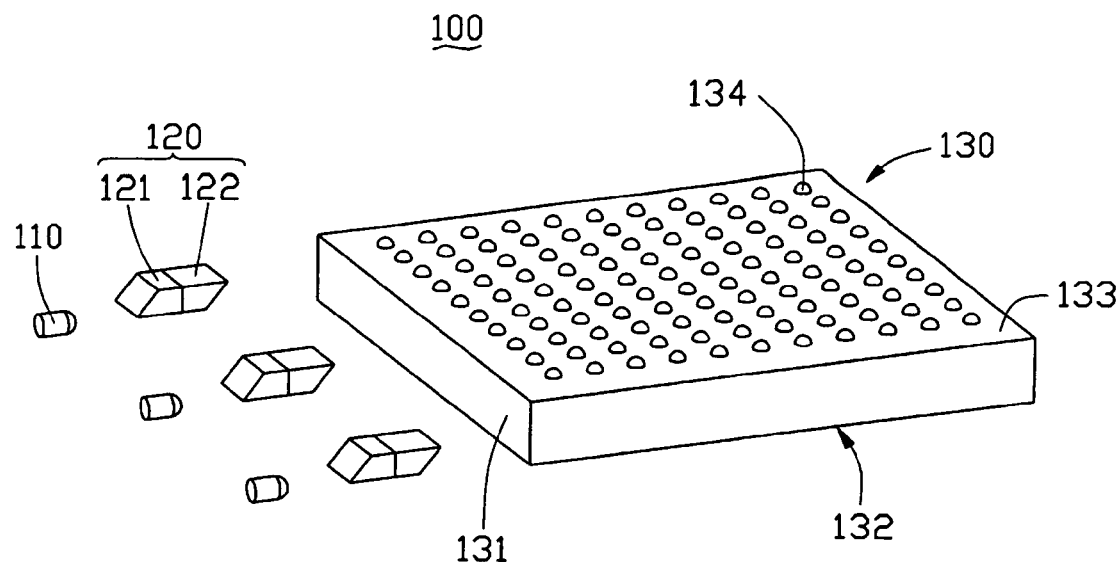
FIG. 1 is an isometric view of a back light module in accordance with the first preferred embodiment of the present invention, the back light module including a plurality of birefringent crystal assemblies.

For facilitating understanding, like components are designated by like reference numerals throughout the various embodiments of the invention as shown in the various drawing figures.

Reference will now be made to the drawing figures to describe the present invention in detail.

Referring to FIG. 1, a back light module 100 of the first preferred embodiment of the present invention includes a light guide plate 130 made of a transparent material, a plurality of LEDs 110 aligned parallel to a light incident surface 131 of the light guide plate 130, and a corresponding plurality of birefringent crystal assemblies 120 respectively located between the LEDs 110 and the light incident surface 131. Each of the light sources corresponds to a respective one of the birefringent crystal assemblies and emits light beams directly to the corresponding birefringent crystal assembly, as seen from FIG. 1. Radiation angles of light beams emitted from the LEDs 110 are enlarged by the birefringent crystal assemblies 120, and the light beams then enter the light guide plate 130 through the light incident surface 131.

The light guide plate 130 is a substantially rectangular plane body, and includes the light incident surface 131, the light-emitting surface 132, a bottom surface 133, and three side surfaces (not labeled). A plurality of reflective dots 134 are formed on or applied on the bottom surface 133, so as to enhance uniform emission of light from the light-emitting surface 132. Further, in order to improve optical efficiency, reflective sheets or films can be attached on the bottom surface 133 and the side surfaces.

Figure 2:
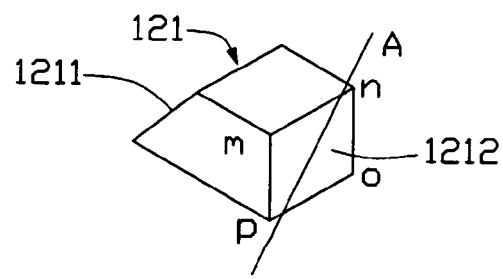
FIG. 2 is an enlarged, isometric view of a first birefringent crystal of any one of the birefringent crystal assemblies of FIG. 1, but viewed from another aspect.
Figure 3:
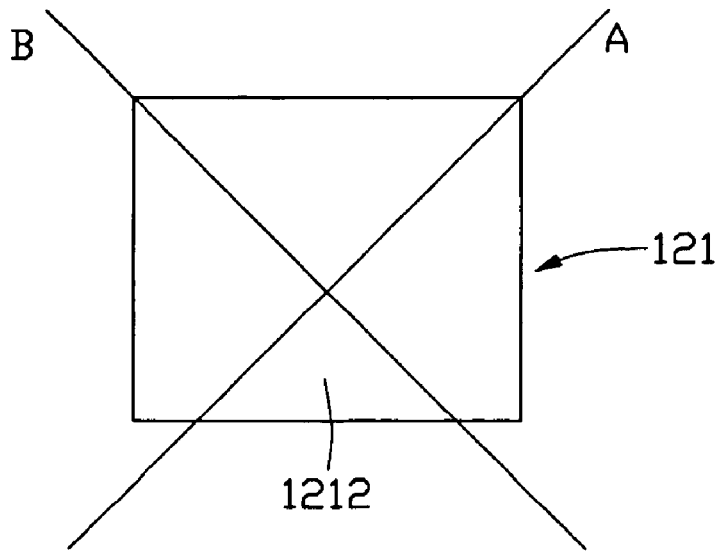
FIG. 3 is an enlarged, isometric view showing optical axes of the two wedge birefringent crystals of the birefringent crystal assembly of FIG. 1.

Referring also to FIG. 2 and FIG. 3, each birefringent crystal assembly 120 is substantially a parallelepiped. The birefringent crystal assembly 120 includes a generally wedge-shaped first birefringent crystal 121 and a generally wedge-shaped second birefringent crystal 122 adhered to the first birefringent crystal 121. The birefringent crystals 121, 122 have substantially identical structures. The first birefringent crystal 121 includes a first surface 1211 and a second surface 1212, and the second birefringent crystal 122 includes a first surface 1222 and a second surface 1221. The two first surface 1211, 1222 are oblique to and opposite to the two second surface 1212, 1221 respectively, which are substantially parallel to the light incident surface 131 of the light guide plate 130. The two second surfaces 1212, 1221 are adhered to each other thereby forming the birefringent crystal assembly 120. Each first birefringent crystal 121 has an optical axis A on a plane MPONM thereof, and the optical axis A forms a 45 degrees angle with respect to an MP direction. Each second birefringent crystal 122 has an optical axis B perpendicular to the optical axis A of the corresponding first birefringent crystal 121.

Figure 4:
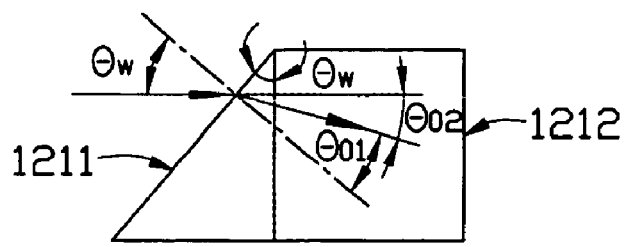
FIG. 4 is an enlarged, side elevation of the first birefringent crystal of FIG. 2, showing an essential optical path thereof.
Figure 5:
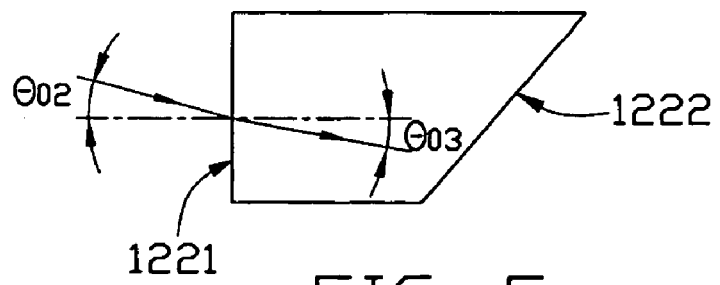
FIG. 5 is an enlarged, side elevation of a second birefringent crystal of any one of the birefringent crystal assemblies of FIG. 1, showing an essential optical path at a second surface thereof.
Figure 6:
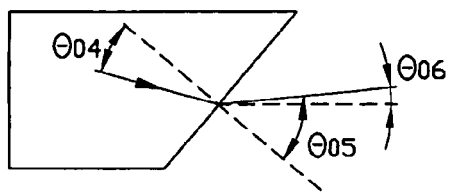
FIG. 6 is similar to FIG. 5, but showing an essential optical path at a first surface of the second birefringent crystal.

Referring to FIGS. 4-6, in operation, an angle between the first surface 1211 and the second surface 1222 is represented as $\theta_w$. When an light beam emitted from each LED 110 enters the corresponding first surface 1211, the birefringence characteristics of the first birefringent crystal 121 split the light beam into two beams: an o-ray and e-ray. The o-ray and the e-ray have polarization planes perpendicular to each other, and therefore the two polarized light beams have separate optical paths. As regards the optical path of the o-ray, when the light beam enters the first surface 1211 of the first birefringent crystal 121 (shown in FIG. 4), the incident angle is $\theta_w$, the refractive angle is $\theta_{o1}$. The relationship between the incident angle and the refractive angle is:

$$\sin\theta_w = n_o \sin\theta_{o1}$$

When the o-ray enters the interface of the second surface 1212 of the first birefringent crystal 121 and the second surface 1221 of the second birefringent crystal 122 (shown in FIG. 5), the incident angle $\theta_{o2}$ equal to $\theta_w$ minus $\theta_{o1}$. The refractive index of the incident medium is $n_o$. Because the second birefringent crystal 122 has an optical axis B perpendicular to the optical axis A of the first birefringent crystal 121, the o-ray in the first birefringent crystal 121 has characteristic of an e-ray in the second birefringent crystal 122. The refractive index of the emitting medium is $n_e$, and the refractive angle is $\theta_{o3}$. The relationship between the incident angle and the refractive angle is:

$$n_o \sin(\theta_w - \theta_{o1}) = n_e \sin\theta_{o3}$$

When the o-ray enters the first surface 1222 of the second birefringent crystal 122 (shown in FIG. 6), the incident angle $\theta_{o4}$ is equal to $\theta_w$ minus $\theta_{o3}$, the refractive index of the incident medium is $n_e$, the refractive index of the emitting medium (air) is designated as 1, and the refractive angle is $\theta_{o5}$. The relationship between the incident angle and the refractive angle is:

$$n_e \sin(\theta_w - \theta_{o3}) = \sin\theta_{o5}$$

Then when the o-ray emits from the birefringent crystal assembly 120, it forms an angle $\theta_{o6}$ relative to a plane that is parallel to a bottom surface of the birefringent crystal assembly 120, wherein $\theta_{o6}$ is equal to $\theta_w$ minus $\theta_{o5}$. Thus, a radiation angle of light beams is enlarged.

Figure 7:
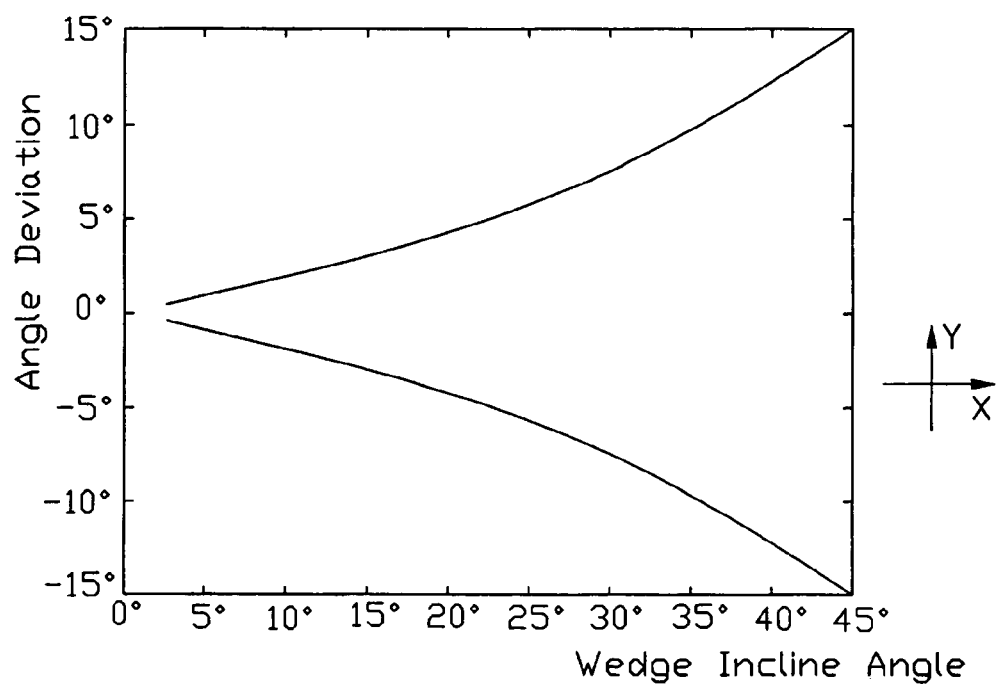
FIG. 7 is a graph showing an angle deviation of light beams emitted from any one of the birefringent crystal assemblies of FIG. 1 varying according to a wedge incline angle of the first and second birefringent crystals of the birefringent crystal assembly.
Figure 8:
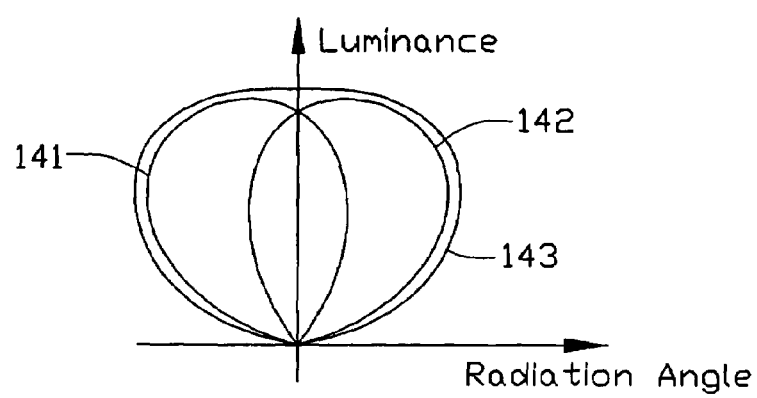
FIG. 8 is a graph of luminance varying according to radiation angle, thus showing an intensity distribution of the light beams emitted from any one of the birefringent crystal assemblies of FIG. 1.

Similar to the optical path of the o-ray in the first birefringent crystal 121 and the second birefringent crystal 122, after passing through the birefringent crystal assembly 120, the resulting e-ray also forms an angle relative to the plane that is parallel to the bottom surface of the birefringent crystal assembly 120. Referring to FIGS. 7 and 8, the result is that the birefringent assemblies 120 provide excellent enlargement of the radiation angles of the light beams emitted from the LEDs 21. The light beams with enlarged radiation angles enter the light guide plate 130 through the light incident surface 131, thereby providing excellent uniformity of brightness for an associated liquid crystal display panel (not shown). The light intensity curve 141, 142 represent the split beams, and light intensity curve 143 represents the joined beam whose radiation angle is increased.

Figure 9:
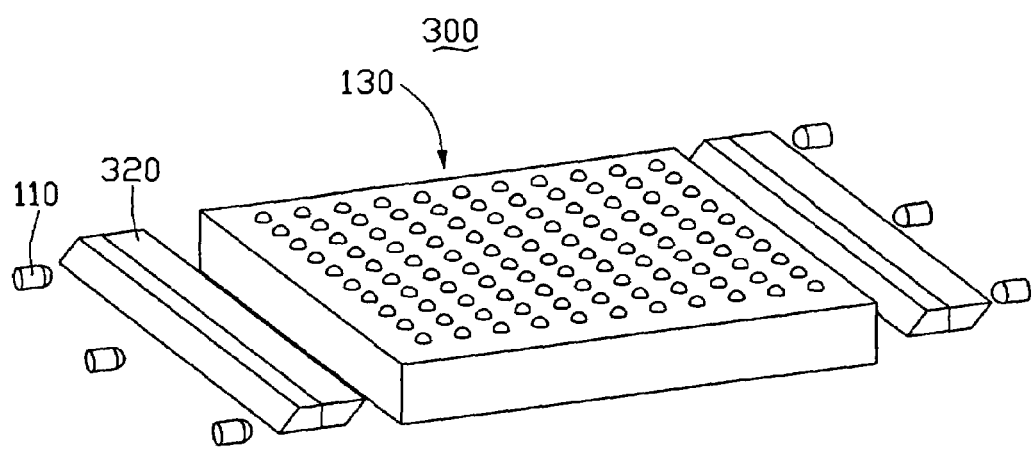
FIG. 9 is an isometric view of a back light module in accordance with a second preferred embodiment of the present invention.
Figure 10:
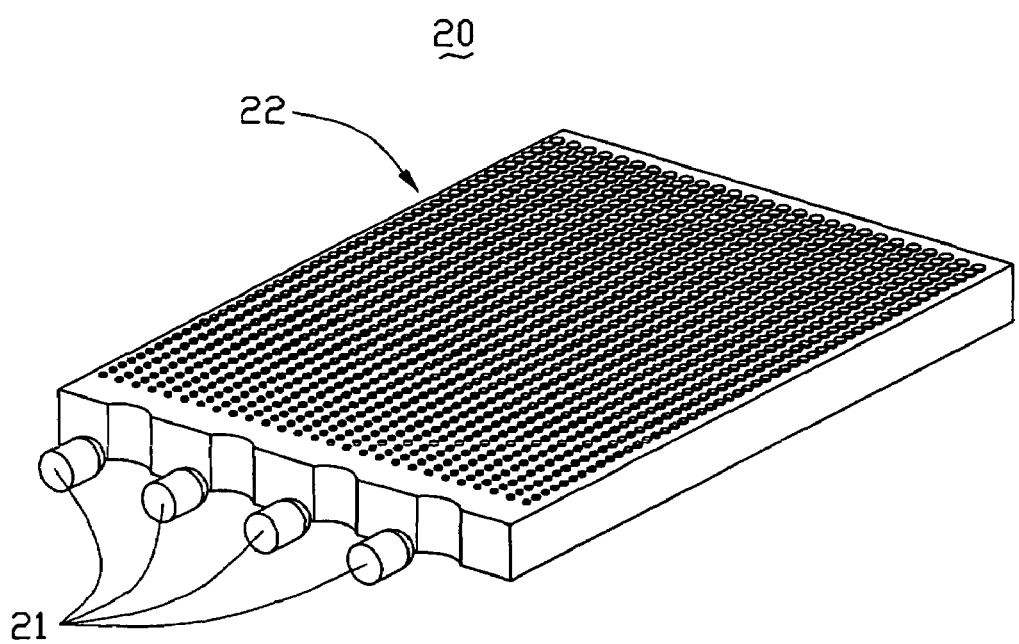
FIG. 10 is an isometric view of a conventional back light module.
Figure 11:
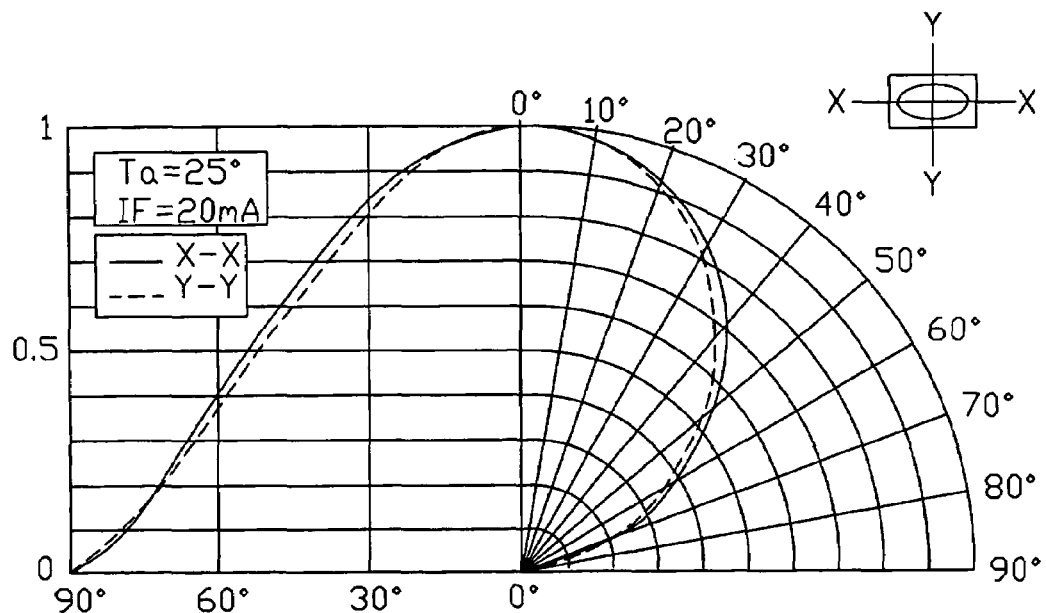
FIG. 11 is a graph showing an intensity distribution of the light beams emitted from an LED of the back light module of FIG. 10 varying according to radiation angle of the light beams emitted from an LED.
Figure 12:
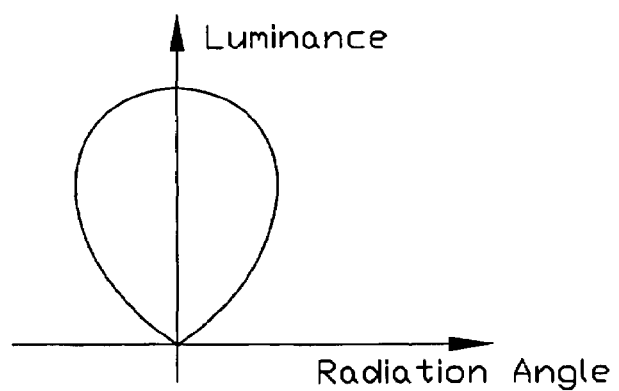
FIG. 12 is a graph of luminance varying according to radiation angle, thus showing an intensity distribution of the light beams emitted from the LED of the back light module of FIG. 10.

Referring to FIG. 9, a back light module 300 of the second preferred embodiment of the present invention has a structure similar to that of the back light module 200. The difference is that the back light module 300 includes two long birefringent crystal assemblies 320 positioned adjacent two opposite ends of the light guide plate 130 respectively. Each birefringent crystal assembly 320 couples with a plurality of corresponding aligned LEDs 1109 and includes two generally wedge-shaped birefringent crystal adhered to each other.

In the present invention, any of the birefringent crystals can be lithium niobate ($LiNbO_3$) or yttrium orthovanadate ($YVO_4$) crystals. The greater the birefringent effect that the birefringent crystal has, the more uniform brightness of the back light module can be. Further, another kind of light source having similar characteristics to those of LEDs can be used instead of the LEDs.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A back light module comprising:
   a light guide plate;
   a plurality of aligned light sources configured for providing light beams at one side of the light guide plate; and
   at least one birefringent crystal assembly located between the light sources and the light guide plate, the birefringent crystal assembly comprising two generally wedge-shaped birefringent crystals adhered to each other and being configured for enlarging a radiation angle of light beams, each of the wedge-shaped birefringent crystals comprising a first surface and a second surface, the first surface being oblique to an incident surface of the light guide plate, the second surface being opposite to the first surface and parallel to the incident surface of the light guide plate, the two second surfaces of the wedge-shaped birefringent crystals adhering to each other.

2. The back light module as described in claim 1 wherein the back light module comprises a plurality of the birefringent crystal assemblies, and a number of the birefringent crystal assemblies is equal to a number of the light sources, each of the light sources corresponds to a respective one of the birefringent crystal assemblies and emits light beams directly to the corresponding birefringent crystal assembly.

3. The back light module as described in claim 1, wherein the birefringent crystals are lithium niobate crystals.

4. The back light module as described in claim 1, wherein the birefringent crystals are yttrium orthovanadate crystals.

5. The back light module as described in claim 1, wherein an angle between optical axes of the two birefringent crystals is substantially 90 degrees.

6. The back light module as described in claim 1, wherein said birefringent crystal assembly is substantially a parallelepiped.

7. The back light module as described in claim 1, wherein the light sources are light emitting diodes.

8. The back light module as described in claim 1, wherein light beams emitted from said point light source enter the incident surface of the light guide plate by penetrating one first surface, the two second surfaces, and the other first surface, in sequence.

9. A back light module comprising:
a light guide plate;
at least one point light source located beside said light guide plate;
at least one light splitting/rejoining device comprising two generally wedge-shaped birefringent crystals adhered to each other, each light splitting/rejoining device being located between said point light source and the light guide plate so as to initially split light and successively rejoin split light before the light enters the light guide plate, of the wedge-shaped birefringent crystals comprising a first surface and a second surface, the first surface being oblique to an incident surface of the light guide plate, the second surface being opposite to the first surface and parallel to the incident surface of the light guide plate, the two second surfaces of the wedge-shaped birefringent crystals adhering to each other.

10. The light module as described in claim 9, wherein said split light includes an O-ray and E-ray.

11. The light module as described in claim 9, wherein each of split light performs an unsymmetrical optical intensity curve with regard to a symmetrical radiation angle range while the rejoin light performs a symmetrical optical intensity curve with regard to the symmetrical radiation angle range.

12. The light module as described in claim 11, wherein the symmetrical light intensity curve is configured to be shorter and fatter than an original intensity curve derived from the point light source which is not affected by said light splitting/rejoining device.

13. The back light module as described in claim 9, wherein light beams emitted from said point light source enter the incident surface of the light guide plate by penetrating one first surface, the two second surfaces, and the other first surface, in sequence.

14. A light module comprising:
a light guide plate;
at least one point light source located beside said light guide plate;
at least one light transforming device comprising two generally wedge-shaped birefringent crystals adhered to each other, each light transforming device being located between said point light source and the light guide plate so as to convert the one point light source into at least two virtual point light sources thus increasing a light radiation angle range by successive refraction, each of the wedge-shaped birefringent crystals comprising a first surface and a second surface, the first surface being oblique to an incident surface of the light guide plate, the second surface being opposite to the first surface and parallel to the incident surface of the light guide plate, the two second surfaces of the wedge-shaped birefringent crystals adhering to each other.

15. The light module as described in claim 14, wherein a maximum light intensity of a transformed light is smaller than that of light which is not affected by said light transforming device.

16. The light module as described in claim 14, wherein light beams emitted from said point light source enter the incident surface of the light guide plate by penetrating one first surface, the two second surface and the other first surface, in sequence.

* * * * *